United States Patent

Miller

[15] 3,704,401
[45] Nov. 28, 1972

[54] DUAL MOTOR CONTROL
[72] Inventor: Robert N. Miller, Dallas, Tex.
[73] Assignee: International Computer Products, Inc., Addison, Tex.
[22] Filed: July 20, 1970
[21] Appl. No.: 56,545

[52] U.S. Cl. .................. 318/7, 242/75.51, 318/59, 318/72
[51] Int. Cl. ............................................. H02p 5/50
[58] Field of Search............318/7, 54, 55, 56, 59, 60, 318/62, 69, 70, 71, 72, 80, 331; 242/75.51, 186

[56] References Cited

UNITED STATES PATENTS

| | | |
|---|---|---|
| 2,325,381 | 7/1943 | Edwards et al. .........242/75.51 |
| 3,223,906 | 12/1965 | Dinger..........................318/7 |
| 3,508,134 | 4/1970 | Dosch et al................318/331 |

OTHER PUBLICATIONS

IBM Technical Disclosure Bulletin Vol. 12 No. 11 p. 1,805 4/1970 – Electrical Differential Tape Drive System–Weidenhammer Primary Examiner—E. A. Goldberg
Assistant Examiner—H. Huberfeld
Attorney—Giles C. Clegg, Jr.

[57] ABSTRACT

A dual motor drive system for synchronously controlling a first motor to drive a first reel and a second motor to drive a second reel to maintain a substantially constant, symmetrical linear velocity of material transferred between said reels as the diameter of the spools material varies as a non-linear function of the amount of material stored thereon. A reference signal is provided which is a function of a desired linear velocity of material transferred between the two reels. A summed signal is provided which varies as a function of the sum of the speeds of the first and second motors. The summed signal is compared with the reference signal to provide an error signal. The power supplied to the first motor driving the first of the two reels, which functions as a take-up reel, is controlled by the error signal, thereby controlling the speed of the motor. A smaller amount of power is supplied to the second motor associated with the second reel functioning as the supply reel to overcome inertia in the system and reduce the effects of coulomb resistance during starting and to provide braking action to maintain tension on the length of material extending between the two spools when running or stopping. Rate of movement of material between the two reels can be controlled or direction of movement reversed by changing the reference signal level or polarity respectively. Upon reduction of rate of movement or reversal, the second motor is driven to provide positive braking action or to change direction of movement as required with the previously driven first motor then operating as a brake.

16 Claims, 12 Drawing Figures

INVENTOR.
ROBERT N. MILLER
BY

INVENTOR.
ROBERT N. MILLER
BY

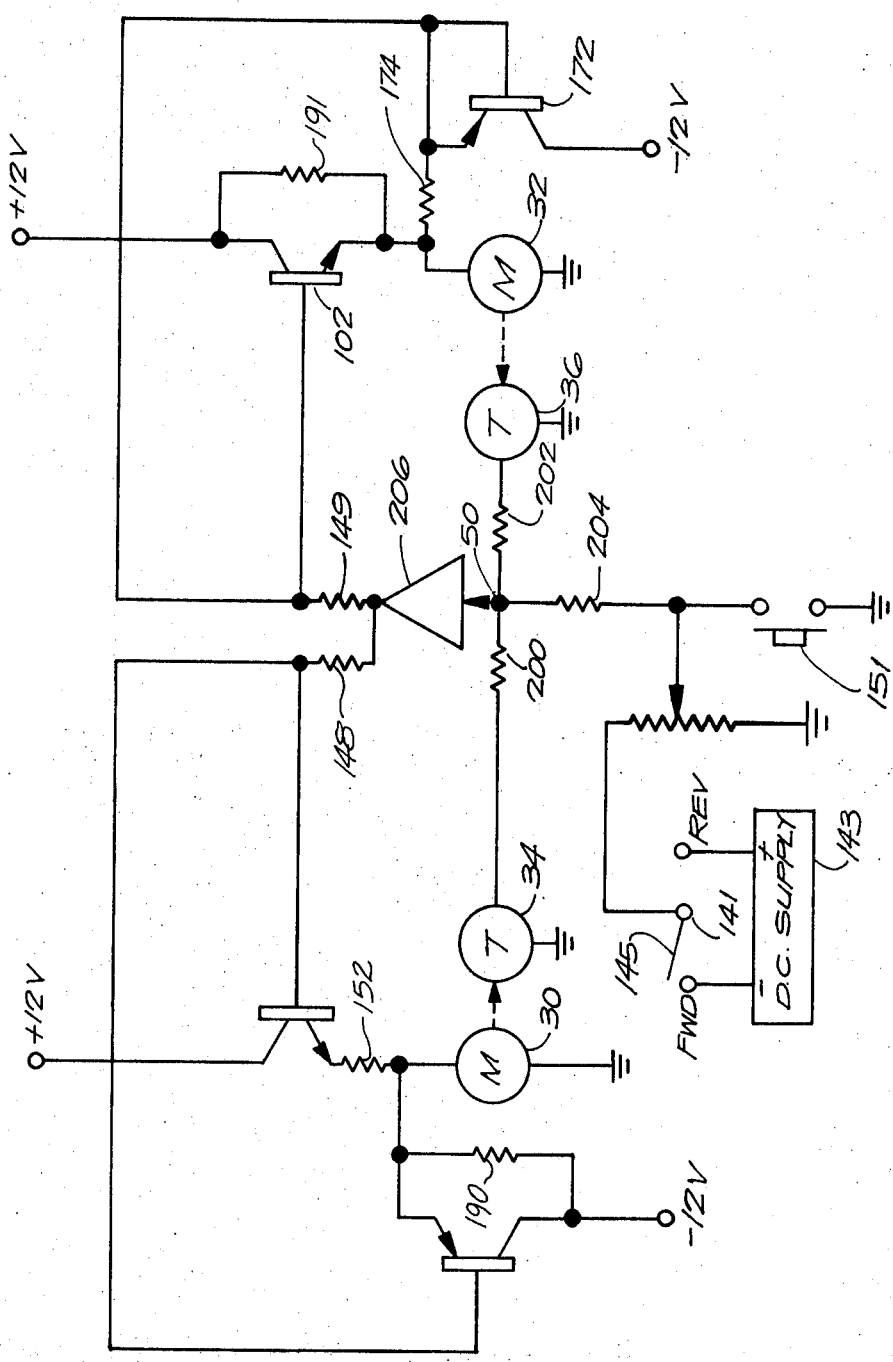

DUAL MOTOR CONTROL

BACKGROUND OF THE INVENTION

The present invention relates to a motor control system and, more particularly, to a dual motor drive system for synchronously controlling two motors to drive a pair of associated reels for transferring material between the two reels.

It is oftentimes desirable to transfer material from one reel to a second reel at a substantially constant linear velocity with one of the reels being driven by one of the motors and the second being driven by a second motor. Exemplary of such applications would be magnetic tape drive assemblies. While the invention is especially adaptable to a system for transporting magnetic tape, it is also applicable to any system in which it is desired to transfer material between two reels at a substantially constant speed.

Many different systems are used for driving magnetic tape in the course of recording and playback of information stored on the tape. One system is referred to as a capstan system wherein the tape is moved across a recording or playback head by what is commonly referred to as a capstan drive. The capstan rotates at a constant speed providing a constant tape velocity. The supply reel on which a supply of magnetic tape is stored is subjected to a small amount of braking action to prevent tape leaving the supply reel at a greater than desired rate. The take-up reel, on the other hand, is driven at a greater than necessary speed through a slip clutch arrangement in order that the take-up reel will always be capable of rotating at a rate sufficient to accommodate the rate at which tape is fed to the take-up reel as the diameter of the spool of material on the take-up reel varies. Although such a system operates very satisfactorily when used with separate reels, it has serious drawbacks when incorporated into tape cassette recording and playback systems because of the relatively small dimensions of the cassettes. Therefore, in tape cassette recording and playback systems, it is common to employ a tape drive assembly that uses two motors, one for each of the two tape reels.

In the less expensive cassette tape system using two motors, it is conventional to drive the motor which drives the take-up reel at a constant speed. However, when the take-up reel is driven at a constant speed, the linear speed at which the tape enters the take-up reel is non-linear due to an increase in the diameter of the spool of material as tape is wound onto the reel. The density of information recorded on the tape is much greater at the beginning of a spool tape than at the end due to the difference in linear velocities. Such systems are, therefore, wasteful of tape storage capacity in that the maximum information density cannot be provided along the entire length of the tape. Further, in those applications wherein digital information is stored on magnetic tape, it is oftentimes desirable to play back information while driving the tape in the reverse direction to that at which the tape was driven when the information was recorded. In order to accomplish this while maintaining the intelligence of the information, it is necessary that the play-back velocity be substantially the same as the recording velocity for any particular increment of tape. If constant motor speed drive systems are utilized, upon reversal of the driving direction the portion of the tape which was recorded at a high speed will be played back at a low speed and the portion which was recorded at a low speed will be played back at high speed with the two speeds being substantially the same only at approximately the mid-point of the tape.

One method of obtaining a desired substantially linear velocity is to measure the effective radius of the spools of tape by means of a sensing arm which presses against the outer layer of tape on a reel and then to vary the speed of the motor in accordance with the radius of the spool of material as indicated by the sensing arm. However, this method is generally not applicable to tape cassette systems because the two tape reels are totally enclosed in the cassette and cannot be expenditiously reached by a sensing arm. Another method of achieving the required linear speed is to measure the linear speed of the tape by some linear speed sensing elements and then to vary the speed of the drive motor so as to compensate for any deviation in the linear tape speed from the desired value. Such systems do not prove to be altogether satisfactory in that such systems which require a channel of timing signals result in a reduction in amount of information which can be stored on the tape and such systems which require external sensing elements are not readily adaptable to cassette tape systems.

SUMMARY OF THE INVENTION

The present invention provides a dual motor drive system for synchronously controlling two motors to drive two reels to maintain a substantially constant, symmetrical linear velocity of material transferred between two reels which is relatively simple and extremely reliable in operation. The drive system of the present invention is especially applicable to the driving of magnetic tape cassettes in a manner to permit maximum recording density on the entire length of the magnetic tape and to permit playback and recording of information at any time as the tape is driven at any direction. Although the invention is especially adapted for magnetic tape drive systems using D.C. motors, the principles of the invention are readily adaptable to any application in which it is desired to use two motors to drive a pair of reels in order to transfer material between the two reels at a substantially constant linear rate.

In accordance with the present invention, there is provided means for producing a reference signal which is a function of the desired linear speed and means for producing a summed signal which varies as a function of the sum of the speeds of the first and second motors. An error signal is produced which varies as a function of the difference between the summed signal and the reference signal. The error signal is applied to a control means for supplying power to the first motor as a function of the error signal. The second motor acts as a brake maintaining the material extending between the two reels in tension. Preferably, the second motor is energized at a lower level than the first motor to assist the system in attaining the desired speed in the minimal amount of time and reducing the effects of coulomb resistance and inertia on the system. It is particularly desirable that the second motor be energized at a reduced level if the gear ratio between the second motor and its associated reel is large as otherwise excessive strains may be placed on the material being transported.

Also, in accordance with the preferred embodiment of the invention, there is provided means for providing automatic braking in the event it is desired to stop the linear movement of the material and for reversing the direction of movement of the material. In accordance with the preferred embodiment of the invention, the system is stopped by reducing the reference signal to zero, causing the control system to apply a signal to the second motor tending to cause the motor to rotate in the opposite direction. As the speed of the two motors decreases, the amount of current applied to the second motor will decrease until such time as rotation of the motors in the first direction ceases and thereafter additional current of power will not be applied to either motor. To reverse the direction of movement of material, a reference signal of opposite polarity is used causing the system to operate oppositely to that described above.

Many objects and advantages of the invention will become apparent to those skilled in the art as the detailed description of the preferred embodiments of the invention unfolds in conjunction with the appended drawings wherein like reference numerals denote like parts and in which:

FIG. 1 is a curve graphically illustrating the manner in which tape velocity varies when transferred between a supply reel and a take-up reel with the take-up reel driven at a constant angular velocity;

FIG. 2 graphically illustrates the manner in which the speed of a pair of motors and their associates reels varies as material is moved between the two reels at a constant linear speed;

FIG. 3 graphically illustrates the manner in which the linear speed of material moved between two reels driven by motors controlled in accordance with the present invention varies;

FIG. 4 diagrammatically illustrates a magnetic tape drive assembly in accordance with the principles of the present invention;

FIG. 8 is a schematic diagram illustrating the second embodiment of the invention in greater detail;

Figure 1:
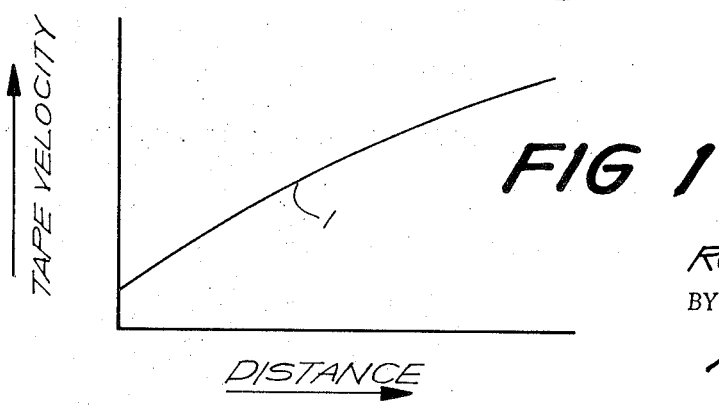

Referring to FIG. 1, if a take-up spool is driven at a constant, angular velocity, the linear velocity of material transferred from a supply spool to the take-up spool will increase as shown in Curve 1. The amount of increase in linear velocity is a function of the increase in diameter of the take-up reel. For example, in a standard Phillips cassette the spool diameter when fully loaded with 3,600 inches of tape is 2.34 times greater than the spool diameter with no tape. The tape velocity varies in a non-linear manner although the velocity of the tape when the take-up spool is fully loaded is approximately 2⅓ greater than when the spool is empty.

Figure 2:
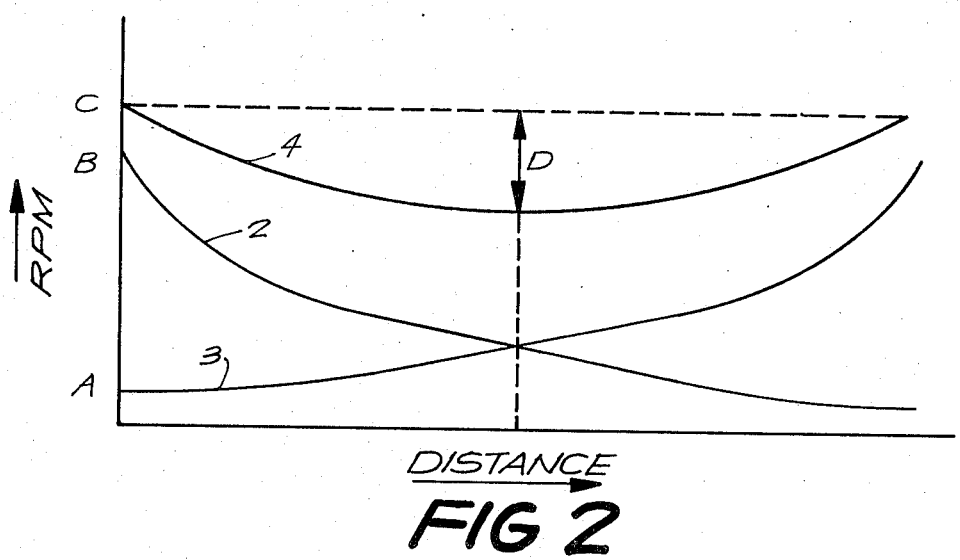

There is shown in FIG. 2 of the drawings, the manner in which the speed of a pair of reels varies as material is transferred from one reel to another at a constant linear velocity. Curve 2 illustrates the variation in speed of the take-up reel and Curve 3 illustrates the variation in speed of the supply reel. The sum of the two speeds is shown in Curve 4. As tape or other material is first transferred from the full supply reel to the empty take-up reel at a constant linear velocity, the angular velocity of the take-up reel will initially be at level B and the angular velocity of the supply reel will initially be at level A with the sum of the two speeds being at level C. As material is transferred between the two reels at a constant linear rate, the speed of the supply reel will increase and the speed of the take-up reel will decrease as a result of changes in the diameter of the spools of material wound on each of the reels. The sum of the two speeds will slowly decrease until it is at the minimum when the amount of material contained on the two reels is equal and thereafter it will increase until it is at level C when all of the material is transferred from the supply reel to the take-up reel. At that time, the speed of the supply reel will be at level B and the speed of the take-up reel will have decreased to level A. It will be noted that the sum of the two speeds is less than level C at all points intermediate the points at which all of the material is contained on the supply reel and the point at which all of the material is contained on the take-up reel; this difference being indicated as D. The difference D is a function of a difference in diameter of each of the reels when no material is contained thereon and the diameter of the spool material when all the material is contained on one reel. If the difference in the two diameters is small, the difference D will also be small. It has been found that in conventional cassettes of the type commonly used, the difference D is approximately 25 per cent of speed C.

Figure 3:
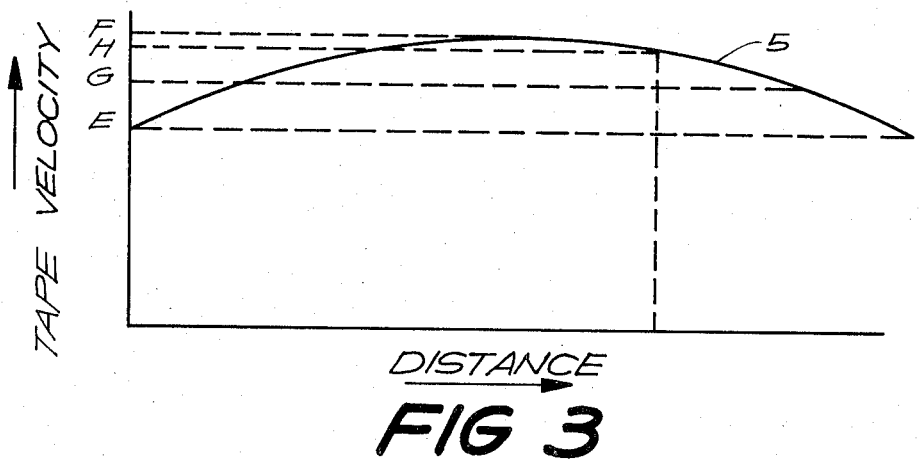

The basic central circuit of the present invention does not provide a constant linear velocity. Rather, the linear velocity is as shown in the curve 5 of FIG. 3 wherein the velocity of the material is at level E when all material is on one reel and at level F at the midpoint of the length of material. The difference in the maximum and minimum velocities is a function of the difference D of FIG. 1. If the reference speed G is the average of speeds E and F, the error will be ± 12.5 percent for the standard Phillips cassette.

Figure 4:
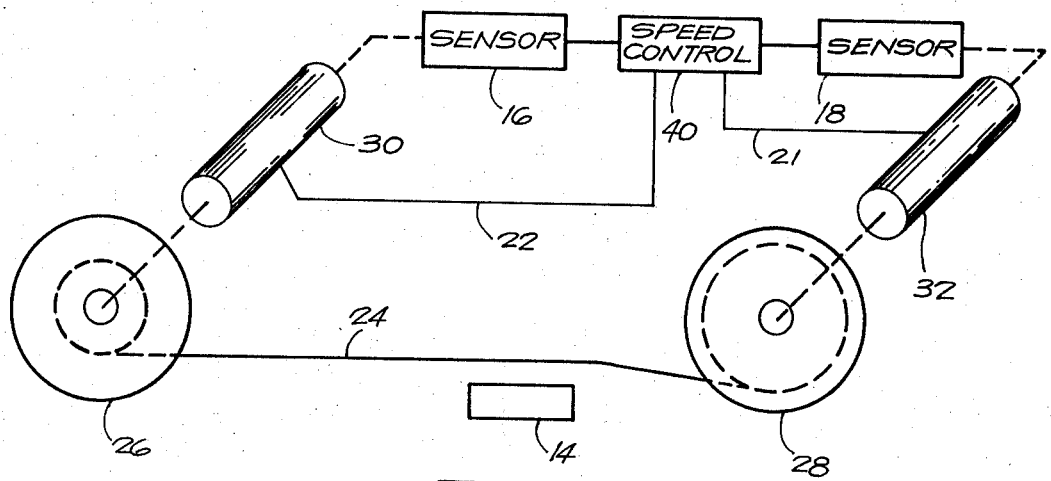

FIG. 4 diagrammatically illustrates the principles of the present invention as applied to a take transport system for transporting magnetic tape. The tape transport system includes a supply reel 26 and a take-up reel 28 on which magnetic tape 24 is wound with the tape extending between the two reels across a magnetic head 14. Magnetic head 14 is suitably capable of either writing onto the tape information or reading information from the tape. In accordance with the present invention, reel 26 is driven by a motor 30 and reel 28 is driven by a motor 32. Although the present invention is especially adapted for control of DC motors, it is adaptable to AC motors whose speed is controllable as a function of an error signal, as, for example, phase control of power supplied to a motor.

The speed of motor 30 is sensed by a sensor 16 and the speed of motor 32 is sensed by a sensor 18. The output of the two sensors is applied to a speed control circuit 40 which generates an error signal which varies as a function of the difference between a reference level and a sum of the speed of the two motors, as indicated by the sensors 16 and 18. Speed control 40 is connected by line 21 to control the power applied to motor 32 as a function of the error signal. Speed control 40 is also connected by line 22 to control the power supplied to motor 30 to be substantially less than that supplied to motor 32 when tape is being transported from reel 26 to reel 28. Since a greater amount of power is applied to motor 32, motor 32 will tend to turn much faster than motor 30 and motor 30 will act as a brake to maintain a desired amount of tension on the tape 24 extending between the two reels. It is desirable that sufficient power be applied to motor 30 that the braking will not be excessive and damage the tape 24.

It is common to provide gearing between the motors and the associated reels such that the reels turn at a much slower speed than the motors. Due to the mechanical advantage provided by the gearing, a substantial amount of pull on the tape could be required to turn the motor overcoming the coulomb resistance and inertia. By providing a suitable amount of power to motor 30, excessive strain on the tape 24 is prevented and much more rapid increase in the speed of the system to the desired level is obtained.

Speed control 40 is preferably adapted for reversing the direction of tape movement. When the direction of tape movement is reversed, the two motors are driven in the opposite direction with power being supplied to motors 30 and 32 in accordance with the difference between the reference level and the sum of the speed of the two motors, but with motor 30 receiving the greater amount of power.

It is important to note that the motors can be reversed at any time and that any increment of tape moving past the magnetic head 14 will travel at the same linear velocity for both directions of movement provided the reference level remains constant. For example, referring to FIG. 3, after X feet of tape have been transferred from the supply reel to the take-up reel, the linear velocity of the tape will be as indicated at H. If at that time the direction of movement of tape was reversed with the reference level remaining constant, the velocity of the tape would slowly increase following the curve 5. At all times, the tape would be transported past the magnetic head 14 at the same speed as that which the tape was moving when information was recorded onto the tape. Accordingly, a small variation in the speed of the speed does not adversely affect the playback characteristics. It is further important to note that since the difference between the reference speed G and the minimum tape velocity E attained at the extreme ends of movement and the maximum velocity of the tape F attained at the midpoint is only ± 12.5 percent for typical cassettes, very little storage space on the tape is wasted.

Figure 5:
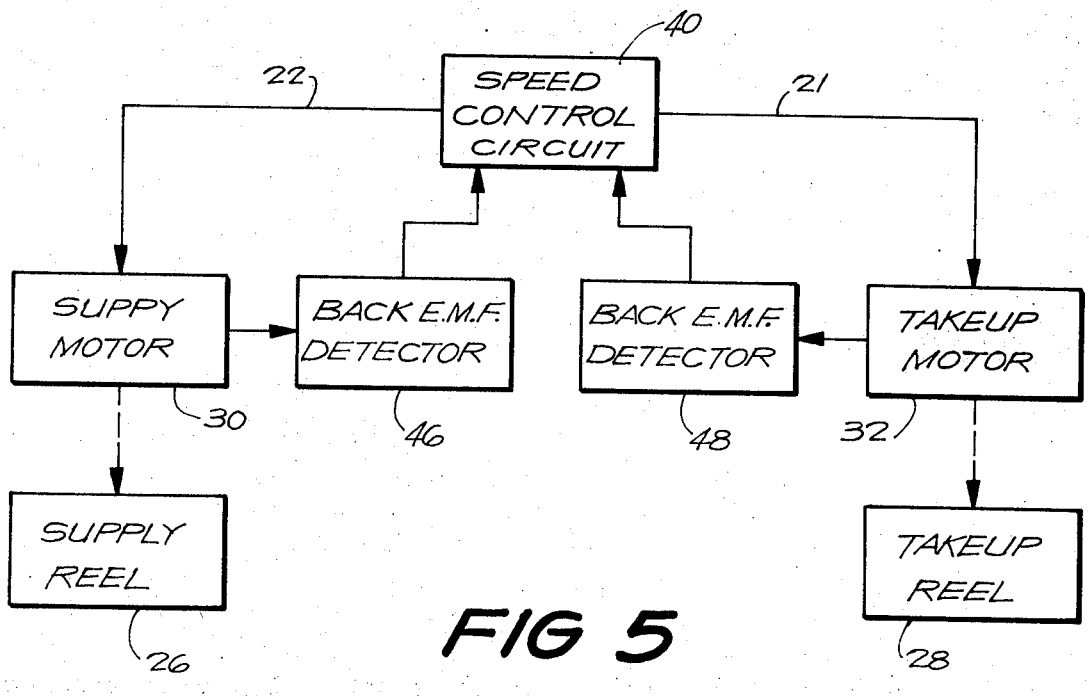
FIG. 5 is a block diagram of a first embodiment of the invention.

One preferred embodiment of the invention is shown in FIG. 5 of the drawings wherein back EMF detectors 46 and 48 are associated with motors 30 and 32 respectively. The back EMF detectors provide output signal levels which vary as a function of the speed of the motor. The output signals from the back EMF detectors are applied to the speed control unit 40 which then controls the power supplied to the motor 32 and, preferably, also to the motor 30 as described above.

Figure 6:
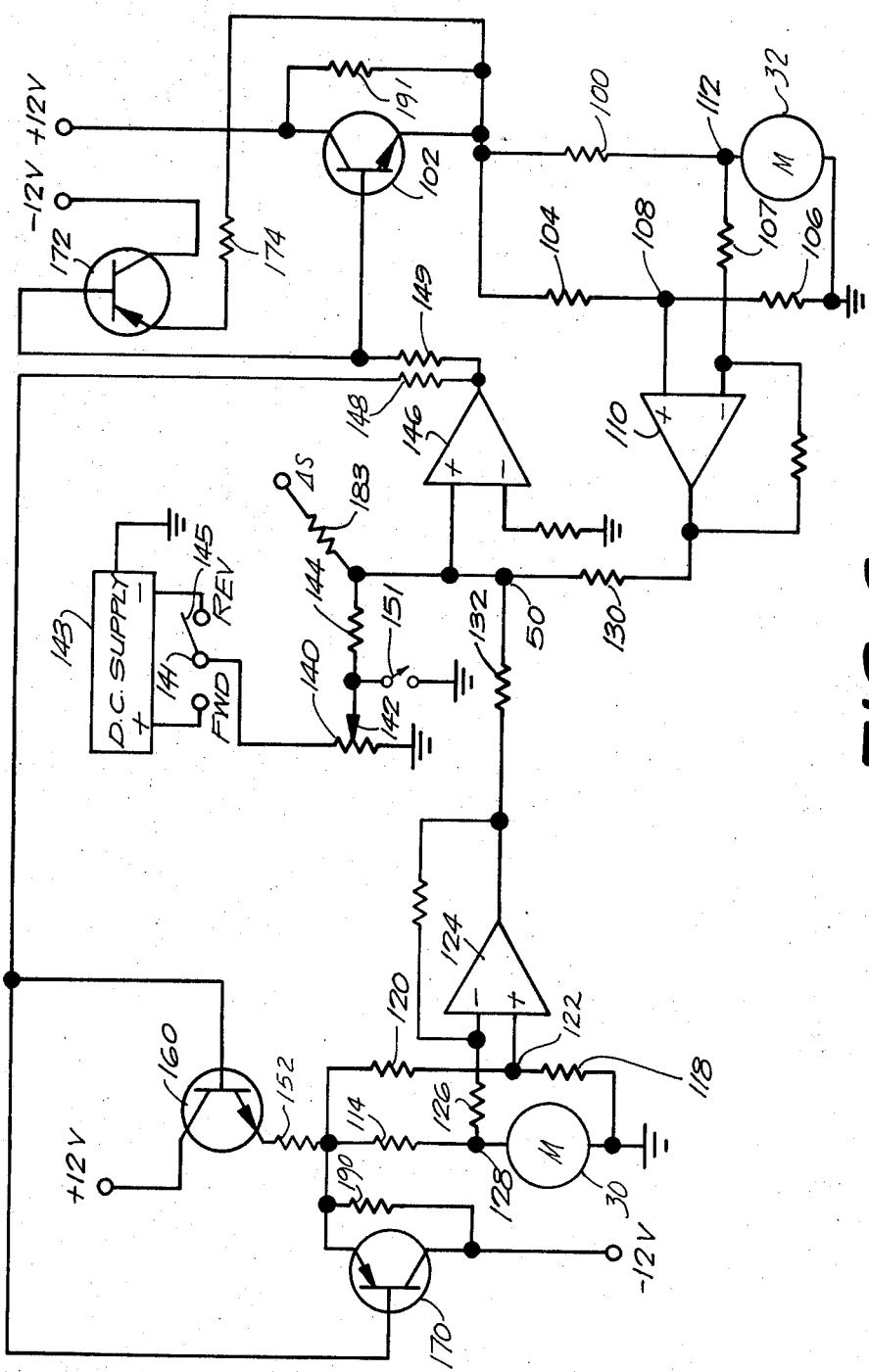
FIG. 6 is a schematic diagram illustrating the first embodiment of the invention in greater detail.

The operation of the embodiment of the invention shown in FIG. 5 of the drawings can be more completely understood with reference to FIG. 6 of the drawings. In accordance with the embodiment of the invention shown in FIG. 6, resistor 100 is connected in series with the motor 32 and the emitter-collector of transistor 102 across a source of positive voltage which suitably can be in the order of 12 volts. The particular voltage used will, of course, be that required to supply driving power to the motor 32. When the transistor 102 is biased to a conductive state, a potential is developed across the motor 32 and resistor 100. Resistors 104 and 106 are connected in series across the series circuit comprising the motor 32 and resistor 100 with the juncture 108 between resistors 104 and 106 being connected to one input of a differential amplifier 110. The other input of the differential amplifier is derived from the juncture 112 between the motor 32 and resistor 100 through resistor 107. The output of the differential amplifier 110 is a signal whose amplitude varies as a function of the back EMF developed across the motor 32 if the resistance of resistor 100 is made equal to the winding resistance of the motor or if the gain of the amplifier 110 is a function of the ratio of resistor 100 to the resistance of the motor 32.

Motor 30 is connected to ground with the other side of the motor being connected through resistor 114 to the emitter collector circuit of a transistor 160 to the source of positive potential. In a manner similar to that described with reference to motor 32, resistors 118 and 120 are connected in series across the motor 30 and resistor 114 with the juncture 122 between the two resistors connected to one input of differential amplifier 124. The other input to the differential amplifier 124 is connected through resistor 126 to the juncture 128 between resistor 114 and motor 30. As described with reference to motor 32, the output of the differential amplifier 124 will be voltage level which is a function of the speed of the motor 30.

The output of amplifier 110 is connected to a summing junction 50 through resistor 130 and the output of differential amplifier 124 is connected to summing juncture 50 through resistor 132. Since the output of each of the amplifiers 110 and 124 is of common polarity, the potential appearing at the summing junction 50 from the outputs of the two amplifiers will be a voltage level which is a function of the sum of the speeds of the two motors 30 and 32. Summing junction 50 is connected to one input of differential amplifier 146.

A reference level is provided by a variable resistor 140 connected between ground and terminal 141 of a reversing switch 145. The switch 145 functions to connect the resistor 140 to a source of D.C. voltage 143. When the switch is in the FWD position, terminal 141 will be positive and when in the REV position, terminal 141 will be negative. A sliding contact 142 is connected through resistor 144 to the other input of differential amplifier 146 and through a stop switch 151 to ground.

It can be readily seen that the output from each of the amplifiers 110 and 124 will be a negative potential when the motor EMF is positive. If sliding contact 142 is positioned to be at a positive potential, the input signal applied to the input of amplifier 146 will be the difference between the reference potential level and the sum of the two signals which are a function of the motor speed. When the reference potential is of greater value, the output of amplifier 146 will be at a positive signal level which is applied through resistor 149 to bias transistor 102 on, supplying power to drive motor 32 in a counter-clockwise direction to pull tape from the storage reel onto the take-up reel. The output of amplifier 146 is also applied through resistor 148 to the base of transistor 160. Register 152 is connected in series with the motor load from transistor 160. Accordingly, power will be supplied from the source of positive 12 volts to drive motor 30 in the same direction as the motor 32. The power supplied to motor 30 will be less than that supplied to motor 32 as a function of the size of resistor 152. The amount of drive supplied to the motor 30 is desirably substantially less than that supplied to motor 32 as motor 32 should rotate at substantially higher speeds to prevent spillage of tape. Many factors will affect the particular level at which motor 30 is operated relative to motor 32. However, in one specific example of the invention, good results were obtained when approximately 20 percent of the voltage supplied to motor 32 was supplied to motor 30.

When the motors 30 and 32 have attained a speed such that the sum of their speeds is at the desired level, the sum of the outputs from amplifiers 110 and 124 will be equal to the reference signal from the sliding contact 42. Accordingly, the output of amplifier 146 will be zero and neither of the transistors 102 and 160 will be biased on. If the motors are running at speeds to cause the sum of their speeds to be too great, the signal applied to the input of amplifier 146 from the summing junction 50 will be of greater amplitude than the reference signal causing the output of amplifier 146 to become negative, and neither of the transistors 102 and 160 will be biased on until the sum of the speeds of the two motors falls below the desired level. However, once the sum of the two motors falls below the desired level, the output of amplifier 146 will become positive since the reference signal is of greater amplitude, causing the transistors 102 and 160 to become biased on supplying power to the motors. When the stop switch 151 is closed, the input of the amplifier to which the reference signal is applied will be connected to ground through resistor 144. Accordingly, the output of amplifier 146 will be negative so long as motors 30 and 32 rotate in the counter-clockwise direction. It can, therefore, be seen that the circuit described above provides driving force to the take-up reel and a smaller force of the supply reel. The speed at which the tape is transported is controllable by varying the condition of the sliding contact 142. The system can be stopped either by closing the stop switch 151 or by adjusting the sliding contact 142 to the grounded position.

It is usually desirable to maintain some tension upon the tape at all operating speeds and particularly when the machine is stopped. A simple technique is to provide biasing currents through the motors. Resistor 191 bypasses current across the transistor 102 causing the take up reel motor to attempt to run counter-clockwise and remove tape slack even when the output from amplifier 146 is zero. Similarly, resistor 190 connected to negative potential causes current to flow through supply reel motor 30 causing it to attempt to run clockwise creating tape tension opposite to that of motor 32. These currents are made large enough to maintain taut type but are not sufficient to overcome magnetic head friction and allow residual tape movement.

Provision for dynamic braking of the motors and reversal of the direction of movement of the tape can be made by incorporating transistors 170 and 172 into the circuit. It is practical to connect the motor 30 to a source of negative potential through the emitter-collector circuit of transistor 170 with the base of transistor 170 being connected through resistor 148 to the output of amplifier 146. Similarly, motor 32 is connected through the emitter-collector circuit of transistor 172 to a source of negative potential. The output of amplifier 146 is connected to the base of transistor 172 through resistor 149. When the output of amplifier 146 is negative, transistor 172 will be biased to a conductive state, but will pass less power than transistor 170 as resistor 174 reduces the voltage applied to motor 32. Accordingly, if the output of amplifier 146 becomes negative when the motor is rotating in a counter-clockwise direction, dynamic braking will be applied to both motors as the result of reversal in direction of current flow, but the braking effect on motor 30 will be much greater than the braking effect on motor 32. The dynamic braking provided by the control circuit of the present invention is particularly important when either the reversing switch 145 or the stop switch 151 is operated as it minimizes the amount of material that is transported after operation of one of the two switches. The dynamic braking is also important in normal driving operation in that it minimizes the possibility of the motors attaining excessive speeds.

As noted previously with reference to FIG. 3 of the drawings, the tape speed will not be constant. An additional error signal can be derived, as by using a prerecorded timing track, which can be applied to the inputs of amplifier 146 through summing resistor 183 to maintain a constant linear velocity.

Figure 7:
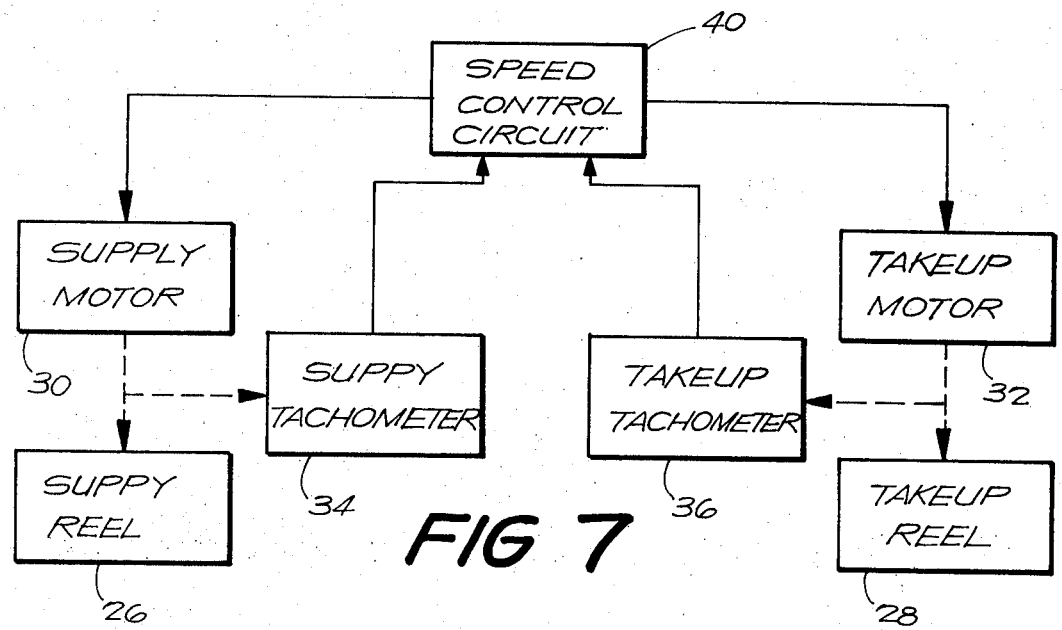
FIG. 7 is a block diagram illustrating a second embodiment of the invention.

A second embodiment of the invention is shown in FIG. 7 of the drawings wherein a supply tachometer 34 is connected to be driven by the motor 30 and a take-up tachometer 36 is connected to be driven by the motor 32. The tachometers 34 and 36 are exemplary of other suitable sensors.

Referring now to FIG. 8 of the drawings, it can be seen that the control circuitry is essentially the same as that shown in FIG. 5 of the drawings, but that resistors 100 and 114 are not required and the remainder of the back EMF sensing circuitry has been replaced by the tachometers. The output of the tachometers 34 and 36 will be voltage levels whose polarity will be dependent upon the direction of rotation of the motor and whose amplitude is a function of the speed of the associated motor and are functionally the same as back EMF detectors 46 and 48. The output of tachometer 34 is applied to the summing junction 50 through a summing resistor 200 and the output of tachometer 36 is applied to summing junction 50 through a summing resistor 202. FIG. 8 also illustrates that it is practical to connect the sliding contact 142 directly to the summing junction 50 through a summing resistor 204 and, if desired, use a conventional single input amplifier 206 rather than a differential amplifier. If the reference potential is of opposite polarity to that the voltages produced by the tachometer 34 and 36, the potential appearing at the summing junction 50 will be the difference between the reference potential and the sum of the potentials produced by the tachometers 34 and 36. The connections between reversing switch 145 and supply 143 are reversed from that shown in FIG. 6 to accommodate an inverting amplifier 206 and the polarity of the tachometers is chosen for negative feedback.

Figure 9:
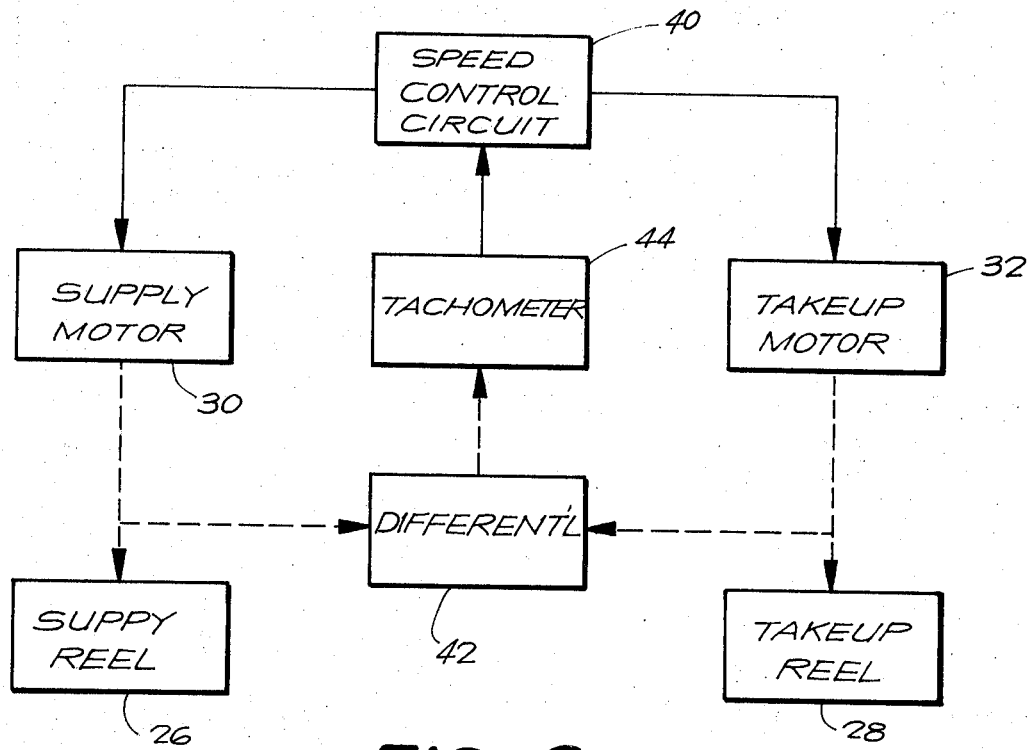
FIG. 9 is a block diagram illustrating a third embodiment of the invention.

The operation of the circuit of FIG. 7 is the same as that described with reference to FIG. 5 of the drawing, the only difference being that a different speed sensing mechanism is used and slightly different method of obtaining the error signal is used. It will be appreciated, in this regard, that the error signal which is a function of the difference between the reference level and the sum of the two speeds can be obtained by many different combinations of inputs to summing junctions and different inputs to amplifiers using signals of different polarities. Also other types of sensing elements such as that shown in FIG. 9 of the drawing may be utilized. For example, there is shown in FIG. 9 of the drawings an embodiment of the invention wherein there is disclosed a summing differential whose output will be the sum of the speed of the supply motor 30 and take-up motor 32.

The summing differential 42 is connected to drive a tachometer 44 whose output will be a voltage which is a function of the sum of the speeds of the motors 30 and 32. The output of the tachometer 44 can be applied to a speed control circuit which is substantially the same as that described with reference to FIGS. 6 or 8 of the drawings. Thus, the output of the tachometer 44 can be summed with a reference signal as disclosed in FIG. 8 with the reference signal and the tachometer signal being of opposite polarity and applied to a common summing junction or, as shown in FIG. 6, the reference signal can be applied to one input of the differential amplifier and the tachometer output being applied to the other input of the differential amplifier to provide an error signal which is a function of the difference in the reference voltage and a signal which is a function of the sum of the speeds of the two motors. It will be appreciated, in this regard, that many other types of devices for providing voltages of the level which is the function of the sum of the two speeds and for comparing the voltage which is a function of the sum of the two speeds with a reference voltage level to provide an error signal will be apparent to those skilled in the art.

As noted previously, an additional error signal can be derived as by using a prerecorded timing track, which can be applied through a summing resistor to a summing junction for compensating for the small error in tape speed to maintain a constant linear velocity.

Figure 10:
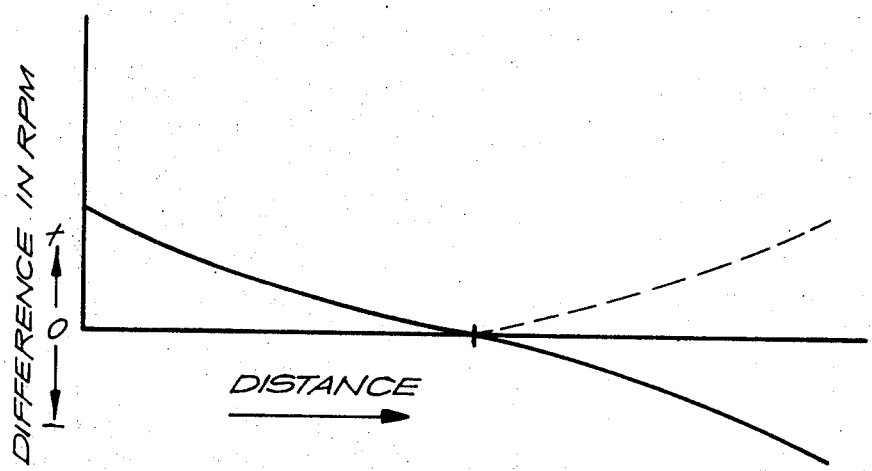
FIG. 10 is a curve illustrating the manner in which a signal which is a function of the difference in the motor speeds varies.

Provision of a timing track on the tape reduces the amount of data which can be stored on the tape and it is not practical in those applications in which the density of the data stored is important. Another example of a corrective signal which can be applied to the summing junction 50 in order to obtain a more linear tape speed is a signal derived from the difference in motor speeds. Thus, if the speed of the supply reel is subtracted from the speed of the take-up reel, the resulting curve, as shown in FIG. 10 will be one which commences at a positive level and its instantaneous amplitude decreases until it is zero at the mid point of the reel. Thereafter, the values of the curve become negative and increase to maximum negative value at such time as all of the tape has been transferred to the take-up reel.

Figure 11:
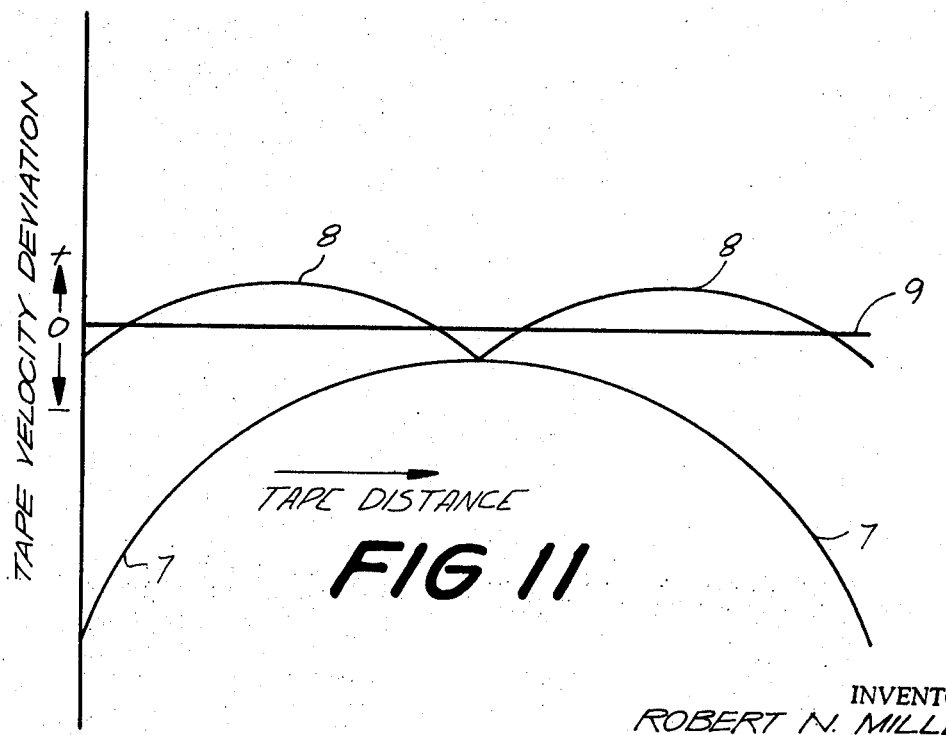
FIG. 11 is a group of curves illustrating the effect upon linear speed of material transferred between two reels driven by motors controlled in accordance with a fourth embodiment of the invention.

FIG. 11 illustrates the effect upon speed regulation when different percentage amounts of the absolute magnitude of the difference signal are applied to the summing junction 50. Curve 7 illustrates the speed curve when zero percent of the difference value is applied to the summing junction. It will be noted that when zero per cent of the difference signal is applied to the summing junction, no effect will be made on the velocity of the tape. On the other hand, if one hundred per cent of the difference signal is applied to the summing junction, the variation in tape velocity will be extremely great, adversely effecting the speed regulation. Much improvement in the speed characteristics can be obtained by applying only a predetermined percentage of the difference signal to the summing junction 50. Thus, as shown in curve 8 of FIG. 11, great improvement can be obtained. As mentioned before, the error will be a function of the maximum and minimum spool diameters with the error being reduced as the difference in spool diameters decreases. Similarly, as the difference in diameters of the unloaded and fully loaded spools decreases, the percentage of the difference signal applied to the summing junction will also decrease. In accordance with one specific example of the invention using a standard Phillips cassette in which the ratio between the maximum and minimum spool diameters is 2.34, the increase in the tape velocity when the take-up spool is driven at a constant speed is 235 per cent, as shown in FIG. 1 of the drawing. When the speed of the motors is controlled by algebraically summing signals proportional to speed of the two reels with a reference signal, the tape velocity was constant within plus or minus twelve per cent. When the control signal was further modified by applying to the summing junction 56 percent of a signal which is the absolute magnitude of the difference in the two tape speeds, the tape velocity was constant within plus or minus 2.8 percent, as shown in curve 8 of FIG. 11.

Figure 12:
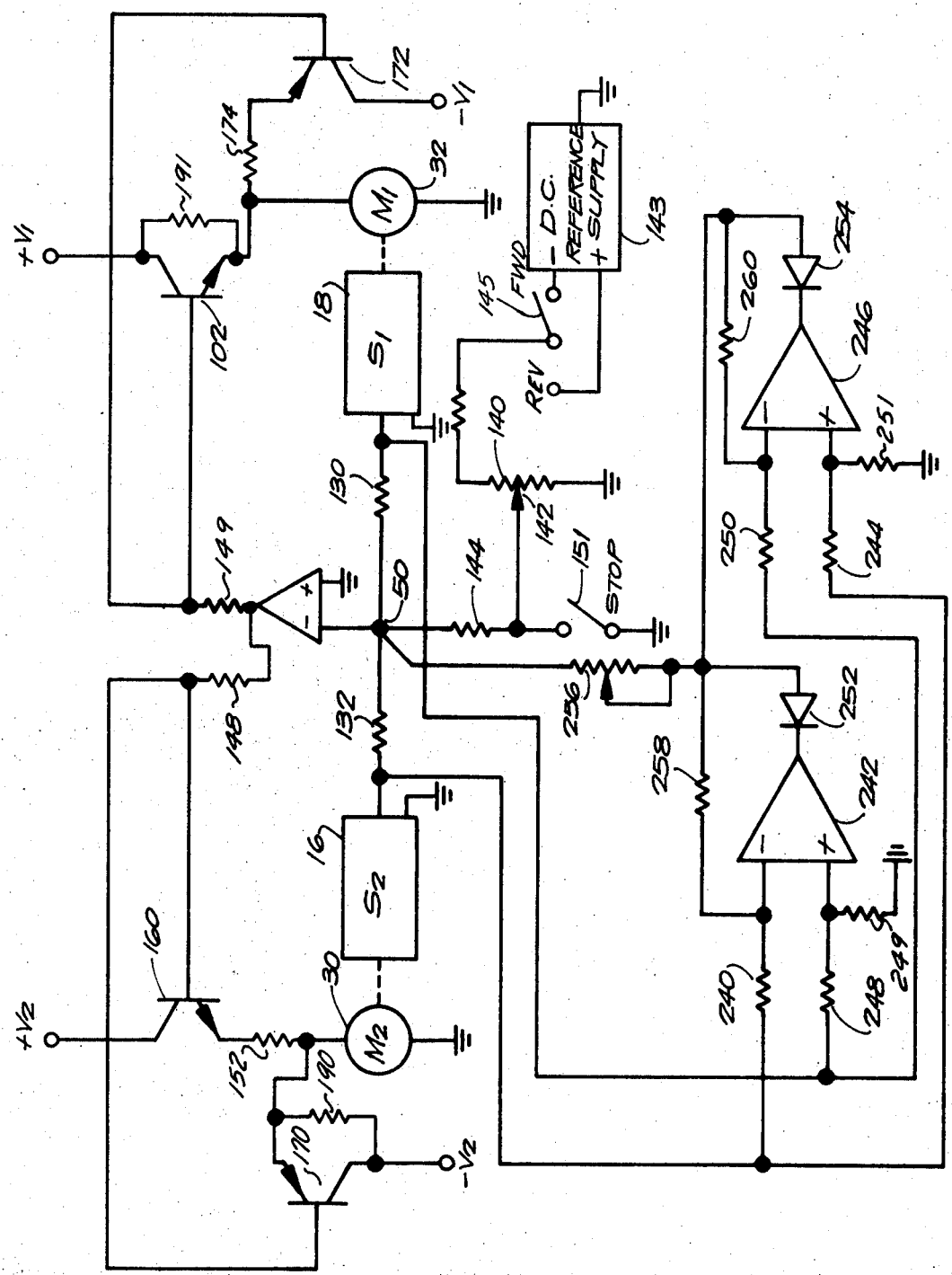
FIG. 12 is a schematic diagram illustrating a fourth embodiment of the invention.

An exemplary circuit for obtaining a difference signal and algebraically summing a desired percentage of the difference signal with the reference signal and the sum signal is shown in FIG. 12 of the drawings. The circuit in FIG. 12 can be seen to be similar to that shown in FIGS. 6 and 8 in that outputs of sensors 16 and 18 are applied to the summing junction 50 through summing resistors 132 and 130 respectively. Similarly, a reference signal is applied to the summing junction through summing resistor 144. The output of sensor 16 is applied through resistor 240 to the minus input of differential amplifier 242 and through resistor 244 to the plus input of a differential amplifier 246. The output of sensor 18 is applied through resistor 248 to the plus input of differential amplifier 242 and through resistor 250 to the minus input of differential amplifier 246. The output of differential amplifier 242 will be negative so long as the output of sensor 18 is less than the output of sensor 16. Similarly, the output of amplifier 246 will be negative when the output of sensor 16 is less than the output of sensor 18. The output of amplifier 242 is connected to the cathode of diode 252 and the output of amplifier 246 is connected to the cathode of diode 254. The anodes of the diode 252 and 254 are commonly connected through summing resistor 256 to the summing junction 50.

The operation of the circuit is such that given a difference between the output of sensors 16 and 18, only the amplifier having a negative going output will function to control the voltage applied to resistor 256. The gains of the amplifiers are set by resistor pairs 240/258 and 248/249 for amplifier 242, and 250/260 and 244/251 for amplifier 246. Typically these might be made equal to each other to provide unity inverting gain in each amplifier. It can be seen that each amplifier works as a unity gain amplifier for one polarity of input signal but will be saturated with its output isolated by the diode when the input signal is of opposite polarity. Because of the reversed input connections and the common output connection, the negative output voltage will be equal to the absolute magnitude of the voltage difference between the sensors and, therefore, to the difference between reel velocities.

In FIG. 11, resistor 256 is indicated as being variable since only a predetermined percentage of the difference signal is applied to the summing junction. The resistor 256 would normally be a fixed resistor whose resistance would be determined by the percentage of the difference signal to be applied to the summing junction once the percentage is empirically determined. The percentage of the difference signal applied to the summing junction can be controlled by other means such as varying the resistance of resistors 258 and 260 to thereby control the gain of the differential amplifiers. It will be appreciated that two differential amplifiers are employed in order that the difference signal applied to the summing junction 50 will be of a desired polarity. Other means could be used for accomplishing similar results.

In the specific example shown, when tape is transferred in the forward direction from the supply reel to the take-up reel the outputs of sensors 16 and 18 will be positive and the reference potential will be negative. The difference signal will also be negative. During the first half of the tape, the output of amplifier 246 will be negative and applied through diode 254 to summing junction 50. The output of amplifier 242 will be positive and blocked by diode 252. During the second half of the tape, the polarity of the amplifier outputs will reverse and the negative output of amplifier 242 will be applied to the junction 50.

The affect of the difference signal is greatest at the beginning and end of tape and is zero at the center. Thus, the difference signal cancels a part of the sensor output and causes the tape speed to increase to re-establish speed stability. This increase enables a close approximation to constant tape speed.

It is important to note that the circuit of FIG. 12, as shown provides improved speed regulation only in the forward direction. When reversing switch 145 is operated to the REV position, the reference voltage polarity will be reversed and, upon reversal of rotation the outputs of the sensors will become negative. The affect of the difference signal, in the absence of reversal of its polarity, will be to make the motors run slower. Improved speed regulation in the reverse direction can be obtained by connecting the reversing switch 145 to also reverse the connections of diodes 252 and 254 such that the polarity of the difference signal will be reversed and will be positive rather than negative.

Although the invention has been described with reference to particular preferred embodiments thereof, many changes and modifications will become apparent to those skilled in the art in view of the foregoing description which is intended to be illustrative and not limiting of the invention defined in the claims.

What is claimed is:

1. A motor control for controlling a first motor to drive a first reel to maintain a substantially constant linear velocity of material transferred between said first reel and a second reel as the diameter of the spools of material on said two reels varies as a non-linear function of the amount of material stored thereon comprising:
   a. means for producing an error signal which varies as a function of the difference between a reference level and the sum of the speed of the two reels; and
   b. controls means for supplying power to said first motor as a function of said error signal.

2. A control as defined in claim 1 wherein said means for producing an error signal comprises first and second sensor means for producing first and second output signals whose amplitude varies as a function of the speed of said first and second reels respectively, means for summing said first and second output signals, reference signal producing means for producing a reference signal which is a function of a desired reference level linear speed of said material transferred between said first and second reels and amplifier means responsive to the difference in amplitude of said reference signal and the sum of said first and second output signals for producing said error signal.

3. A control as defined in claim 1 wherein said control means comprises a first signal translating device connected for controlling the power applied to said motor as a function of said error signal.

4. A control as defined in claim 1 further including a second motor connected to drive said second reel and control means for supplying power to said second motor as a function of said error signal.

5. A control as defined in claim 4 wherein the power supplied to said second motor when material is being transferred from said second reel is less than the power supplied to said first motor.

6. A control as defined in claim 4 wherein said control means is effective for supplying power to said first and second motors as a function of said error signal only when said error signal is produced as a result of said reference signal being greater than the sum of said first and second output signals.

7. A control as defined in claim 1 wherein said means for producing an error signal comprises means for producing a first summed signal which is a function of the sum of the speeds of said first and second reels, means for producing a reference signal which is a function of a desired linear speed of material transferred between said first and second reels, and means for producing an error signal as a function of the difference between said reference level and the signal which is a function of the sum of speed of the two reels.

8. A control as defined in claim 7 wherein said means for producing said summed signal which varies as a function of the sum of the speed of the two reels comprises differential means commonly driven with said first and second reels and tachometer means driven by said summing differential for producing a summed signal which varies as a function of the sum of the speeds of said first and second reels.

9. A control as defined in claim 7 wherein said means for producing an error signal comprises first and second tachometers adapted to be driven at speeds which are a function of said first and second reels respectively to produce first and second output signals and means for summing said first and second output signals to produce said summed signal.

10. A control as defined in claim 4 wherein said control means comprises first and second signal translating devices connected in circuit with said first motor for supplying voltage of one polarity to said first motor when said first signal translating device is enabled and for supplying voltage of a second polarity to said first motor when said second signal translating device is enabled, third and fourth signal translating devices connected in circuit with said second motor for supplying voltage of one polarity to said second motor when said third signal translating device is enabled and for supplying voltage of a second polarity to said second motor when said fourth signal translating device is enabled, and means for enabling said first and third signal translating devices when said reference level is greater than said summed signal and enabling said second and fourth signal translating devices when said summed signal is of greater amplitude than said reference level.

11. A control as defined in claim 7 wherein said means for producing an error signal comprises first and second means responsive to a back EMF produced by said first and second motors for producing first and second signals which vary as a function of the speed of said first and second reels.

12. Apparatus as defined in claim 7 further including means for producing a difference signal which is a function of the difference in the speeds of said first and second reels and applying said difference signal to modify said error signal.

13. Apparatus as defined in claim 12 wherein said means for producing said difference signal comprises means for producing a signal having an amplitude which is a function of the difference in speeds of the first and second reels, means for attenuating said signal and applying said signal to modify said error signal as a function of the attenuated amplitude in a sense opposite to that of said summed signal.

14. A method for transferring material between first and second reels at a substantially constant linear velocity as the diameter of the spools of material stored on said reels varies as a non-linear function of the amount of material stored thereon that comprises driving said second reel with a first motor and supplying power to said first motor as a function of the difference between the sum of the speeds of the two reels and a reference level.

15. A method as defined in claim 14 further including the step of modifying said difference by an amount which is a function of the difference in the speeds of the two reels.

16. A method as defined in claim 14 further including the step of driving said first reel with a second motor and supplying power to the second motor at levels less than that at which power is supplied to the first motor.

* * * * *